(12) United States Patent
Harris et al.

(10) Patent No.: US 7,203,385 B1
(45) Date of Patent: Apr. 10, 2007

(54) OPTIMIZING PMD MEASUREMENTS BASED ON TEMPERATURE FOR INSTALLED FIBERS

(75) Inventors: David Lindel Harris, Pleasanton, CA (US); James J. Pan, Foster City, CA (US)

(73) Assignee: Sprint Communications Company L.P., Overland Park, KS (US)

(*) Notice: Subject to any disclaimer, the term of this patent is extended or adjusted under 35 U.S.C. 154(b) by 224 days.

(21) Appl. No.: 11/005,697

(22) Filed: Dec. 7, 2004

(51) Int. Cl.
*G02B 6/00* (2006.01)
*G01N 21/00* (2006.01)
*H04J 14/02* (2006.01)

(52) U.S. Cl. ............................. 385/11; 385/27; 385/28; 385/123; 356/73.1; 398/81

(58) Field of Classification Search ................ 385/11, 385/27, 28, 123, 124, 126, 127, 128; 398/79, 398/81; 356/73.1
See application file for complete search history.

(56) References Cited

U.S. PATENT DOCUMENTS

| | | | |
|---|---|---|---|
| 5,654,793 A * | 8/1997 | Barlow et al. | 356/73.1 |
| 6,704,100 B2 * | 3/2004 | Sengupta et al. | 356/73.1 |
| 6,862,377 B2 * | 3/2005 | Szafraniec et al. | 385/11 |
| 6,996,297 B2 * | 2/2006 | Krause et al. | 385/11 |
| 2005/0174564 A1 * | 8/2005 | Fee | 356/73.1 |

* cited by examiner

*Primary Examiner*—Brian M. Healy (57) ABSTRACT

Methods and networks are disclosed for optimizing PMD measurements on an installed span of fiber. For a method of the invention, a light system transmits light over the installed fiber. A PMD measurement system measures PMD on the fiber over a time period based on the light. A temperature measurement system measures ambient temperatures of the fiber over the time period. The PMD measurements and the ambient temperature measurements are then processed to determine an optimal temperature range for performing future PMD measurements on the fiber. The optimal temperature range indicates the best temperatures to perform measurements, the best time of day to perform measurements, the best time of year to perform measurements (such as summer or winter), etc.

24 Claims, 6 Drawing Sheets

OPTIMIZING PMD MEASUREMENTS BASED ON TEMPERATURE FOR INSTALLED FIBERS

BACKGROUND OF THE INVENTION

1. Field of the Invention

The invention is related to the field of optical communication networks, and in particular, to methods and networks for optimizing Polarization Mode Dispersion (PMD) measurements based on temperature for installed fibers.

2. Statement of the Problem

Many communication companies use an optical network for transmitting data because of its high-bandwidth capacity. Fiber optic cables in the optical network reliably transport optical signals over long distances between a transmitter and a receiver. The fiber optic cables are comprised of transmission fiber, such as a single mode fiber (SMF). Over the length of SMF, the optical signals experience some degradation due to attenuation along the fiber. Fiber background loss in the fiber causes the attenuation, typically about 0.2 dB/km. The optical signals also degrade due to other limitations, such as Polarization Mode Dispersion (PMD), chromatic dispersion, and nonlinear effects.

PMD is a dynamic pulse broadening phenomena. In a single mode fiber, optical pulses propagating down the fiber may separate into two orthogonal modes of polarization that travel at different speeds. The relative amplitudes of these two pulses are determined by the state of polarization of the input pulse relative to the fiber's input principal states of polarization (PSP). The separation into the two orthogonal modes may be caused by intrinsic and extrinsic factors. The intrinsic factors may result from fiber manufacturing processes, such as core ellipticity, or built-in asymmetric stresses. The extrinsic factors may be caused by stresses due to twisting, bending, and environmental effects, such as temperature and thermal gradients.

If the core of the fiber has a perfectly circular cross-section, then both modes travel at the same speed over the same distance. Otherwise, one mode travels slower than the other resulting in a difference in group velocities (an effect called birefringence). The difference in velocities between polarization modes is wavelength dependent and time dependent. The difference in propagation time, $\Delta\tau$, experienced by the two polarization modes at a given wavelength is referred to as the differential group delay (DGD) with units in picoseconds (ps). When the DGD in a fiber becomes excessively large, a receiver is unable to distinguish between a zero bit and a one bit, and bit errors occur eventually resulting in a PMD-induced outage.

Network engineers test installed or buried fibers to determine the effects of PMD on the fibers. To test a fiber, two network engineers are needed. One network engineer travels to an access point on the fiber and connects a light source for the PMD test onto the fiber. The other network engineer travels to another access point, possibly several kilometers away, and connects a PMD test unit onto the fiber. The access points may be a POP site, a manhole, a splice point, etc. With the equipment attached to the fiber, the light source transmits light over the fiber and the PMD test unit measures PMD on the fiber. The network engineers commonly take two PMD measurements for the fiber. Because fiber optic cables typically include many fibers, the network engineers may perform the same test for each fiber of the fiber cable.

Unfortunately, due to the stochastic nature of PMD on fibers, the tests by the network engineers may not accurately reflect the PMD on the fiber at any given time. For instance, the two measurements taken by the network engineers may reflect a low PMD for the fiber, when the maximum PMD may far exceed the measured PMD. The network engineers would have to take measurements over a long period of time to get an accurate measurement of the PMD, which is inefficient and impractical for the PMD tests and is not cost effective.

A major factor contributing to the fluctuation of PMD is temperature. Temperature variations can cause induced stress on a fiber. The stress may cause PMD to fluctuate rapidly or slowly on the fiber. Thus, the accuracy of the PMD measurements depends on the ambient temperature of the fiber. One problem with current PMD tests on installed fibers is that the timing of the PMD measurements is not correlated with temperature to provide more accurate measurements.

SUMMARY OF THE SOLUTION

The invention helps solve the above problems by including temperature as a factor when performing PMD measurements. Because temperature is a factor in PMD fluctuation, the invention includes methods and networks for identifying the effects of temperature on PMD and using that knowledge to improve the accuracy of PMD measurements.

One embodiment of the invention includes a method of optimizing PMD measurements on an installed span of fiber. The fiber has two access points. At one access point, a light system is connected or attached to the fiber. At the other access point, a PMD measurement system is connected or attached to the fiber. A temperature measurement system is installed at some point in the vicinity of the fiber as is designated by the network engineers.

The light system transmits light over the fiber. The PMD measurement system measures PMD on the fiber over a time period based on the light transmitted over the fiber by the light system. The time period should be at least twelve hours, at least twenty four hours, or some other time period that encompasses a complete or nearly complete temperature fluctuation. The temperature measurement system measures ambient temperatures of the fiber over the time period. The PMD measurements and the ambient temperature measurements are then processed to determine an optimal temperature range for performing future PMD measurements on the fiber. The optimal temperature range indicates the best temperatures to perform measurements, the best time of day to perform measurements, the best time of year to perform measurements (such as summer or winter), etc.

This method advantageously allows network engineers to obtain more accurate PMD measurements by including the temperature variable into the measurements. There may be as much as a 50% improvement in accuracy of the measurements. Network engineers can also reduce the time in the field performing future PMD measurements. When the temperature is in the optimal temperature range, the network engineers can go into the field, perform two or three PMD measurements on the fiber, and be assured that the measurements represent the maximum PMD or very close to the maximum PMD on the fiber.

The PMD measurements and the ambient temperature measurements may be processed in multiple ways to determine the optimal temperature range. In one embodiment, the highest of the PMD measurements taken during the time period are identified. The ambient temperature measurements corresponding with the highest of the PMD measurements can then be identified to determine the optimal temperature range. If the highest PMD measurements are observed at the warmest temperatures, then the optimal temperature range includes the warmest temperatures. If the highest PMD measurements are observed at the coolest temperatures, then the optimal temperature range includes the coolest temperatures.

In another embodiment, the PMD measurements and the ambient temperature measurements are plotted in time. A correlation between the PMD measurements and the ambient temperature measurements is then identified. Due to the plotting, the PMD measurements and the ambient temperature measurements should show a correlation. For instance, if PMD increases while temperature increases, then there is a positive correlation between the PMD measurements and the ambient temperature measurements. If PMD increases while temperature decreases, then there is a negative correlation between the PMD measurements and the ambient temperature measurements. If a positive correlation is identified, then the optimal temperature range comprises the warmest temperatures. If a negative correlation is identified, then the optimal temperature range comprises the coolest temperatures.

The invention may include other embodiments described below.

DESCRIPTION OF THE DRAWINGS

The same reference number represents the same element on all drawings.

DETAILED DESCRIPTION OF THE INVENTION

FIGS. 1–9 and the following description depict specific embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
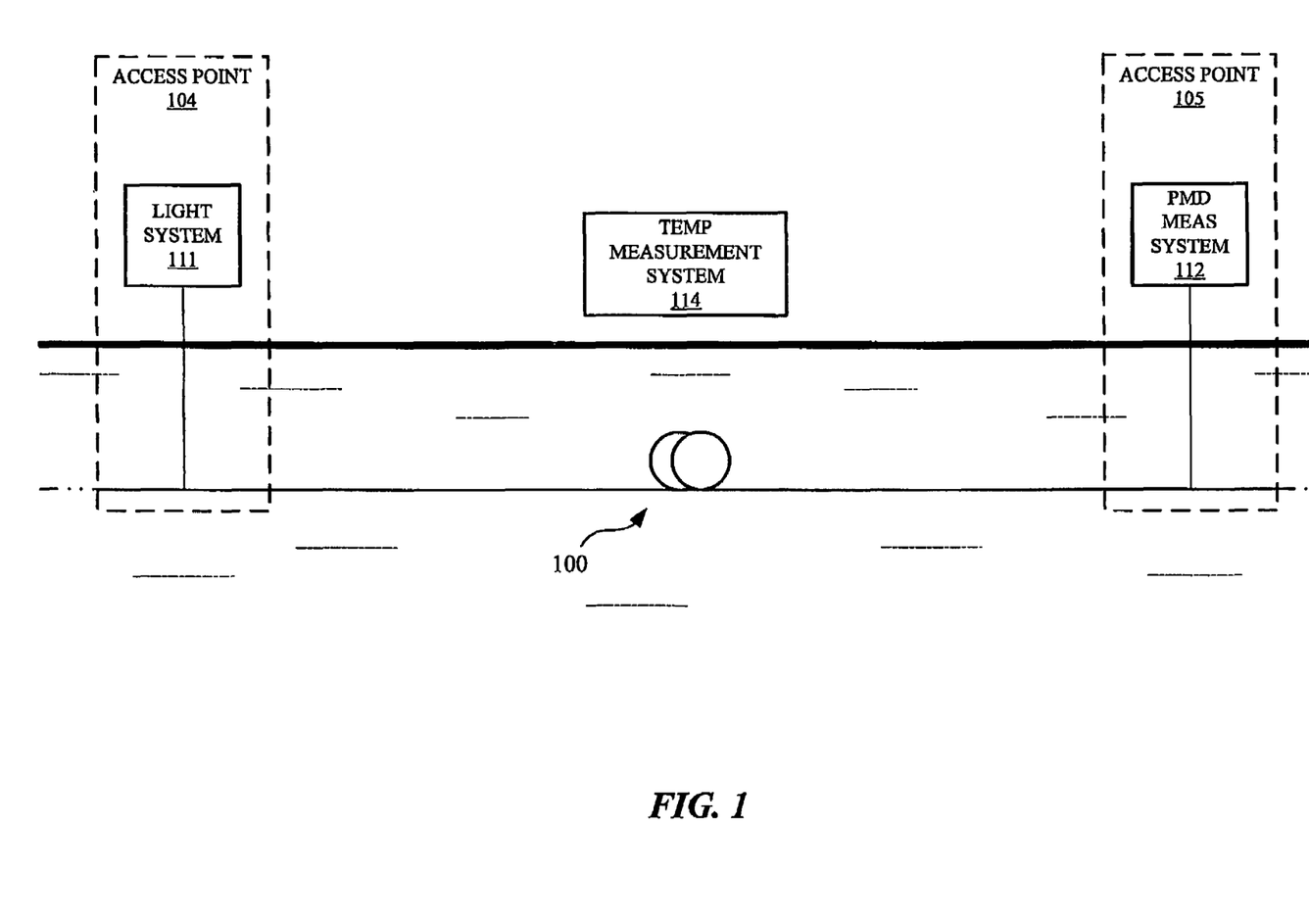
FIG. 1 illustrates an installed fiber prepared for PMD measurements in an embodiment of the invention.

FIG. 1 illustrates an installed span of fiber 100 prepared for PMD measurements in an embodiment of the invention. Fiber 100 may comprise a Single Mode Fiber (SMF) or any other transmission fiber. Fiber 100 is illustrated as a being buried, but fiber 100 may have sections that are not buried. Fiber 100 may be actually installed in a fiber optic cable with many other fibers, but a single fiber 100 is shown for the sake of simplicity.

Fiber 100 has two access points 104–105. Access points 104–105 may comprise an amplifier hut, a POP site, a manhole, a splice point, etc. At access point 104, a light system 111 is connected or attached to fiber 100. Light system 111 is configured to transmit light over fiber 100 in order to test for PMD on fiber 100. At access point 105, a PMD measurement system 112 is connected or attached to fiber 100. PMD measurement system 112 is configured to measure PMD on fiber 100 based on the light transmitted over fiber 100 from light system 111. Temperature measurement system 114 is installed at some point designated by the network engineers to measure ambient temperatures of fiber 100.

Figure 2:
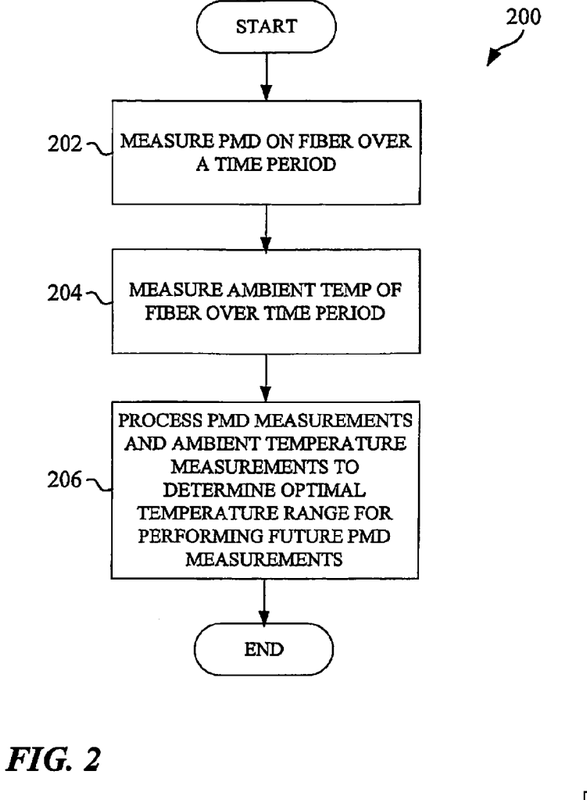
FIG. 2 is a flow chart illustrating a method of optimizing PMD measurements in an embodiment of the invention.

FIG. 2 is a flow chart illustrating a method 200 of optimizing PMD measurements for installed fiber such as fiber 100 in an embodiment of the invention. In step 202, PMD measurement system 112 measures PMD on fiber 100 over a time period based on light transmitted over fiber 100 by light system 111. The time period should be at least twelve hours, at least twenty four hours, or some other time period that encompasses a complete or nearly complete temperature fluctuation. For instance, in the summer time, the temperature may fluctuate between 30° C. and 20° C. and the time period should be sufficient to obtain PMD measurements between 30° C. and 20° C. In the winter time, the temperature may fluctuate between 10° C. and 0° C. and the time period should be sufficient to obtain PMD measurements between 10° C. and 0° C. Generally, the temperature fluctuates between a high and a low in a twelve hour period, but a longer period may be used to ensure to reach the high and the low.

In step 204, temperature measurement system 114 measures ambient temperatures of fiber 100 over the time period. Step 206 includes processing the PMD measurements and the ambient temperature measurements to determine an optimal temperature range for performing future PMD measurements on fiber 100. The optimal temperature range indicates the best temperatures to perform measurements, the best time of day to perform measurements, the best time of year to perform measurements (such as summer or winter), etc.

Method 200 advantageously allows network engineers to obtain more accurate PMD measurements by including the temperature variable into the measurements. Network engineers can also reduce the time in the field performing future PMD measurements. When the temperature is in the optimal temperature range, the network engineers can go into the field, perform two or three PMD measurements on fiber 100, and be assured that the measurements represent the maximum PMD or very close to the maximum PMD on fiber 100.

Figure 3:
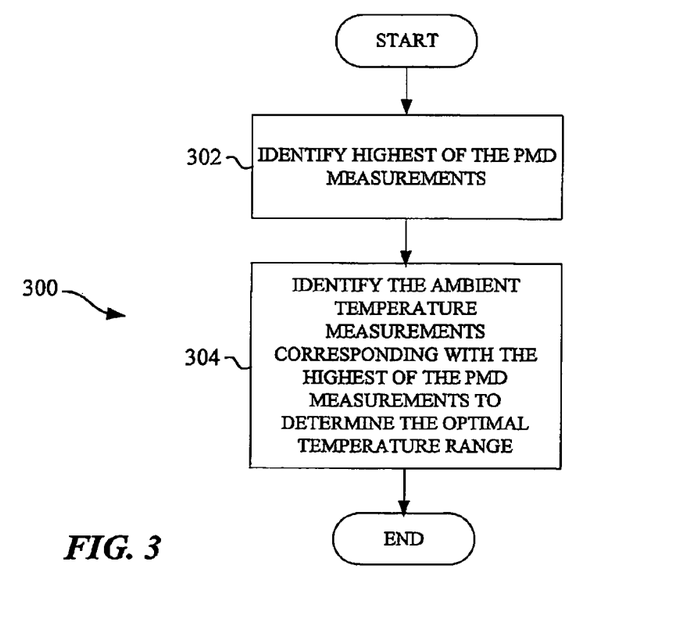
FIG. 3 is a flow chart illustrating one method of processing PMD measurements and ambient temperature measurements to determine an optimal temperature range in an embodiment of the invention.
Figure 4:
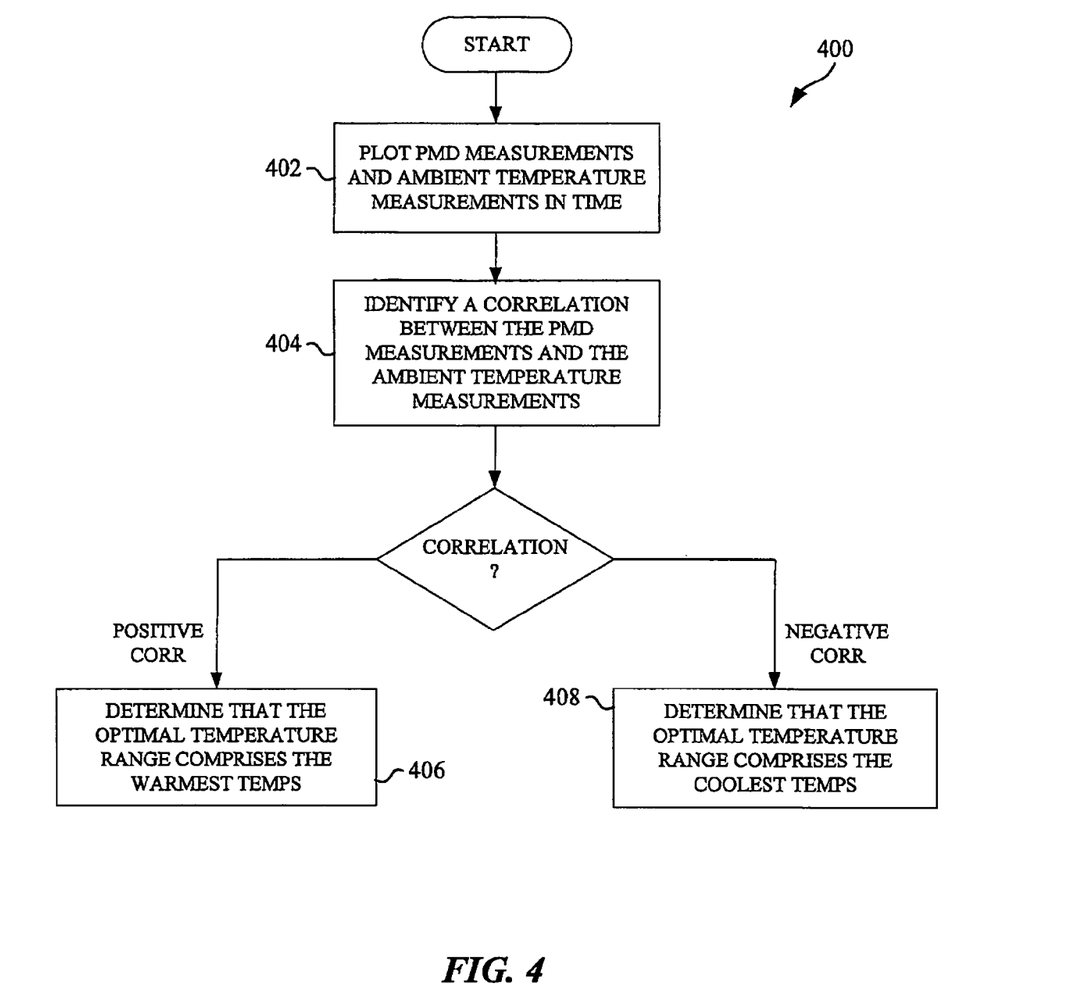
FIG. 4 is a flow chart illustrating another method of processing PMD measurements and ambient temperature measurements to determine an optimal temperature range in another embodiment of the invention.

Step 206 of method 200 can be performed in any desired manner to determine the optimal temperature range. FIGS. 3–4 illustrate two methods of processing the PMD measurements and the ambient temperature measurements to determine an optimal temperature range, but the invention is not limited to these methods.

FIG. 3 is a flow chart illustrating one method 300 of processing the PMD measurements and the ambient temperature measurements to determine the optimal temperature range in an embodiment of the invention. In method 300, step 302 includes identifying the highest of the PMD measurements during the time period. The highest of the PMD measurements can be identified by network engineers after reviewing PMD measurements taken during the time period. The highest of the PMD measurements can alternatively be identified by software or programs that process the PMD measurements taken during the time period. For each of the PMD measurements taken, a corresponding ambient temperature measurement was taken. Therefore, step 304 includes identifying the ambient temperature measurements corresponding with the highest of the PMD measurements to determine the optimal temperature range. If the highest PMD measurements are observed at the warmest temperatures, then the optimal temperature range includes the warmest temperatures. If the highest PMD measurements are observed at the coolest temperatures, then the optimal temperature range includes the coolest temperatures.

For method-300, assume for illustration that the three highest PMD measurements are identified as having a DGD of 0.50 ps, 0.505 ps, and 0.51 ps. Further assume that for the first PMD measurement (DGD=0.50 ps), the temperature measurement is 25.5° C. For the second PMD measurement (DGD=0.505 ps), the temperature measurement is 25.9° C. For the third PMD measurement (DGD=0.51 ps), the temperature measurement is 26.3° C. Also assume that the highest temperatures for the day were 25.5° C., 25.9° C., and 26.3° C. Based on this data, network engineers may determine that the optimal temperature range is between 25.5° C. and 26.3° C. The network engineers may also determine that the optimal temperature range may be above 25° C., above 24° C., above 23° C., etc. The network engineers may also determine that the optimal temperature range comprises temperatures during the day or temperatures during the summer.

FIG. 4 is a flow chart illustrating another method 400 of processing the PMD measurements and the ambient temperature measurements to determine the optimal temperature range in another embodiment of the invention. For method 400, step 402 includes plotting the PMD measurements and the ambient temperature measurements in time. The plotting may be performed by network engineers, or may be performed by software or programs that receive the PMD measurements and the ambient temperature measurements. Step 404 includes identifying a correlation between the PMD measurements and the ambient temperature measurements. Due to the plotting, the PMD measurements and the ambient temperature measurements should show a correlation. For instance, if PMD increases while temperature increases, then there is a positive correlation between the PMD measurements and the ambient temperature measurements. If PMD increases while temperature decreases, then there is a negative correlation between the PMD measurements and the ambient temperature measurements.

The correlation may vary from fiber to fiber-depending on many factors, such as the characteristics of the fibers. Therefore, a positive correlation for one fiber does not necessarily indicate that there will be positive correlations for all other fibers in the same fiber optic cable or other similar fibers.

Figure 5:
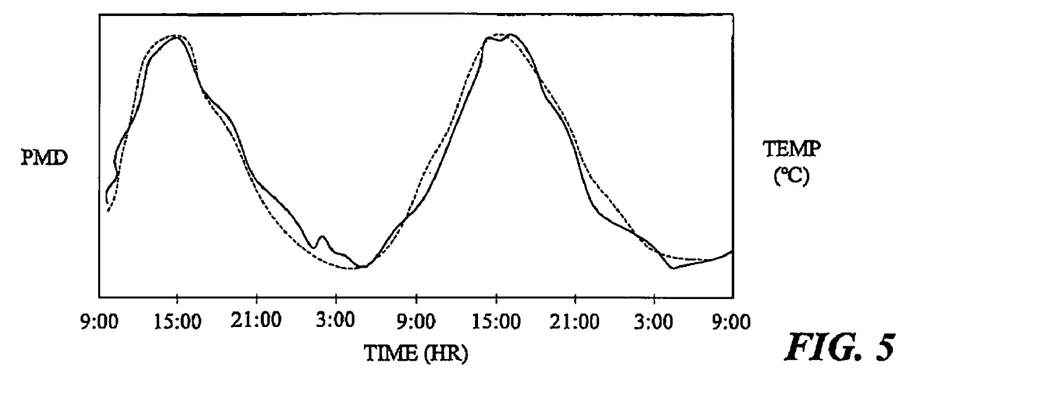
FIG. 5 is a graph illustrating a positive correlation in an embodiment of the invention.

If a positive correlation is identified, then step 406 includes determining that the optimal temperature range comprises the warmest temperatures. FIG. 5 is a graph illustrating a positive correlation in an embodiment of the invention. In FIG. 5, the solid line illustrates PMD measurements taken over a twenty four hour period. The dotted line illustrates ambient temperature measurements taken over the same twenty four hour period. FIG. 5 shows that PMD increases as the ambient temperature increases, and PMD decreases as the ambient temperature decreases. Thus, there is a positive correlation between PMD and ambient temperature.

Figure 6:
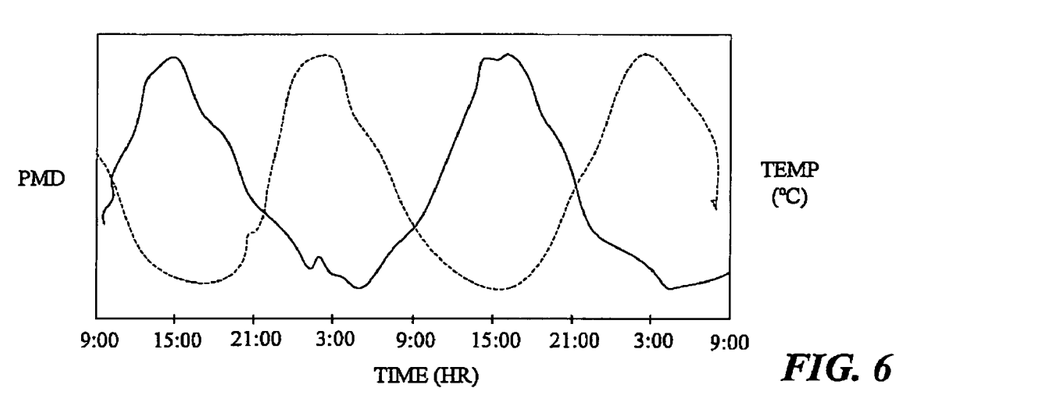
FIG. 6 is a graph illustrating a negative correlation in an embodiment of the invention.

If a negative correlation is identified in step 404 of method 400, then step 408 includes determining that the optimal temperature range comprises the coolest temperatures. FIG. 6 is a graph illustrating a negative correlation in an embodiment of the invention. In FIG. 6, the solid line illustrates PMD measurements taken over a twenty four hour period. The dotted line illustrates ambient temperature measurements taken over the same twenty four hour period. FIG. 6 shows that PMD decreases as the ambient temperature increases, and PMD increases as the ambient temperature decreases. Thus, there is a negative correlation between PMD and ambient temperature.

Based on the identified correlation, network engineers can determine the optimal time to perform PMD measurements. For a fiber having a positive correlation, network engineers will perform PMD tests on that fiber in the summer during the day to get the maximum PMD measurement. For a fiber having a negative correlation, network engineers will perform PMD tests on that fiber in the winter to get the maximum PMD measurement.

Figure 7:
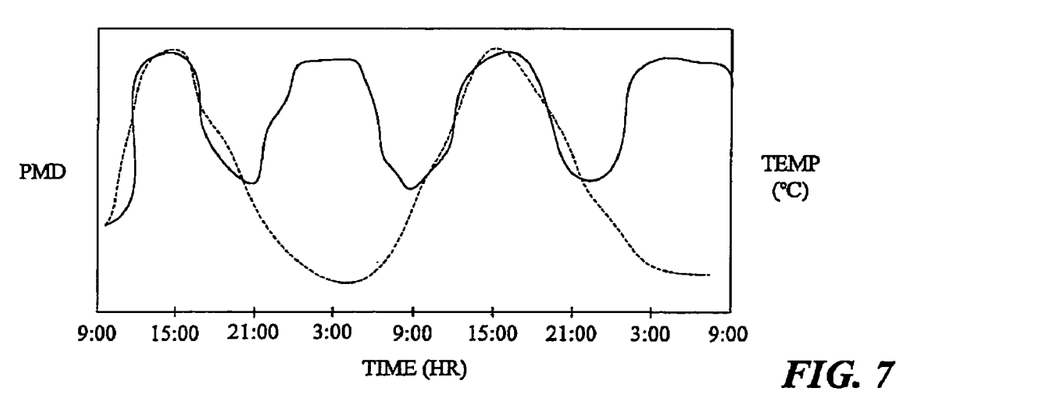
FIG. 7 is a graph illustrating a negative correlation and a positive correlation in an embodiment of the invention.

There may also be both a negative correlation and a positive correlation. FIG. 7 is a graph illustrating a negative correlation and a positive correlation in an embodiment of the invention. In FIG. 7, the solid line illustrates PMD measurements taken over a twenty four hour period. The dotted line illustrates ambient temperature measurements taken over the same twenty four hour period. FIG. 7 shows that PMD reaches a maximum as the ambient temperature reaches a maximum, resembling a positive correlation. The PMD then decreases as the ambient temperature decreases until a certain point. The PMD again increases to a maximum as the ambient temperature reaches a minimum, resembling a negative correlation. Thus, there is both a positive correlation and a negative correlation between PMD and ambient temperature. Network engineers then know that the optimal temperature range is both the warmest temperatures and the coolest temperatures, and PMD measurements may be performed in either the warmest or the coolest temperatures.

Figure 8:
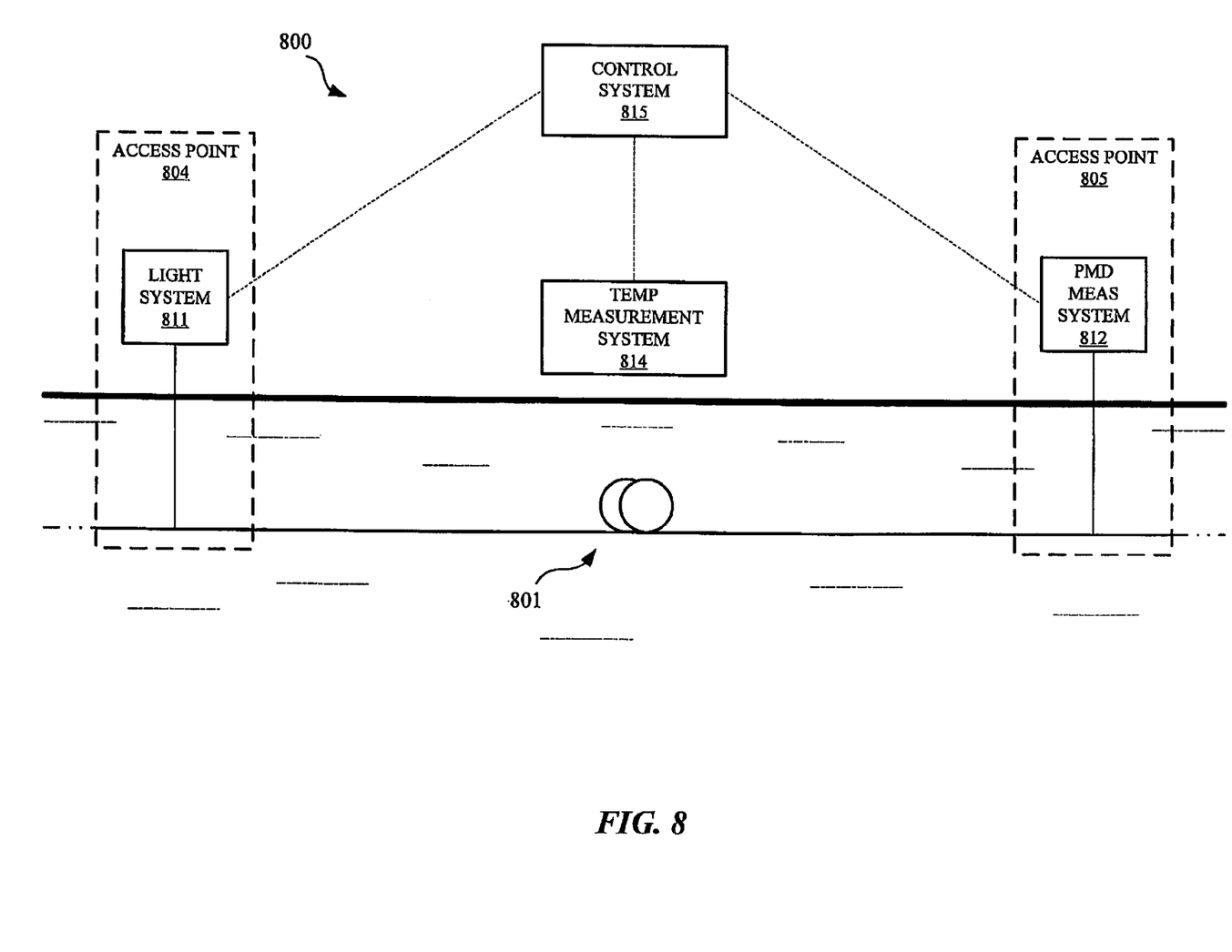
FIG. 8 illustrates a measurement network for measuring PMD on an installed fiber in an embodiment of the invention.

FIG. 8 illustrates a measurement network 800 for measuring PMD on an installed span of fiber 801 in an embodiment of the invention. Fiber 801 may comprise a Single Mode Fiber (SMF) or any other transmission fiber. Fiber 801 is illustrated as a being buried, but fiber 801 may have sections that are not buried. Fiber 801 may be actually installed in a fiber optic cable with many other fibers, but a single fiber 801 is shown for the sake of simplicity. Fiber 801 has two access points 804–805. Access points 804–805 may comprise an amplifier hut, a POP site, a manhole, a splice point, etc.

Measurement network 800 includes a light system 811, a PMD measurement system 812, a temperature measurement system 814, and a control system 815. Light system 811 is connected or attached to fiber 801 at access point 804. Light system 811 is configured to transmit light over fiber 801 in order to test for PMD on fiber 801. PMD measurement system 812 is connected or attached to fiber 801 at access point 805. PMD measurement system 812 is configured to measure PMD on fiber 801 based on the light transmitted over fiber 801 from light system 811. Temperature measurement system 814 is installed at some point designated by the network engineers. Temperature measurement system 814 is configured to measure ambient temperatures of fiber 801.

Light system 811, PMD measurement system 812, and temperature measurement system 814 communicate with control system 815 and possibly each other. The systems may communicate with one another via satellite signals, radio signals, microwave, or any other wireless signals. The systems may also communicate via wirelines.

Under control of control system 815, light system 811 transmits light over fiber 801. PMD measurement system 812 measures PMD on fiber 801 over at least a twelve hour time period, and transmits the PMD measurements to control system 815. Temperature measurement system 814 measures ambient temperatures of fiber 801 over the same time period, and transmits the PMD measurements to control system 815. Control system 815 synchronizes the measurements of PMD measurement system 812 and temperature measurement system 814. After receiving the PMD measurements and the ambient temperature measurements over the time period, control system 815 processes the PMD measurements and the ambient temperature measurements to determine an optimal temperature range for performing future PMD measurements on fiber 801. Control system 815 may indicate the optimal temperature range to network engineers, such as through a GUI, or may generate a plot of the PMD measurements and the ambient temperature measurements for evaluation by the network engineers to determine the optimal temperature range. Control system 815 may also log the measurements taken for each fiber so that the optimal temperature range for each fiber on a fiber optic network can be easily accessed.

Control system 815 may be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Determining the optimal temperature range may also help network engineers in designing networks. There can be a large discrepancy in PMD measurements recorded during the night (lower temperatures) compared to those recorded during day (higher temperatures). In another scenario, there can be a large discrepancy in PMD measurements recorded during the summer compared to those recorded during the winter.

This discrepancy can severely impact the design of any network, mainly the placement of expensive regeneration terminals (e.g., an optical to electrical to optical (O/E/O) module). From a design perspective, if a route carrying OC-192 traffic is PMD limited, meaning that after several 100 km the total link PMD reaches its maximum tolerance in dB, then the signal must be regenerated and re-transmitted again. For OC-192 or 10 Gb/s, the PMD tolerance for 1 dB is about 10 ps. For OC-768 or 40 Gb/s, the PMD tolerance for 1 dB is about 4 ps. When designing a network, up to 1 dB of PMD penalty is allowable. Beyond this, the system will not necessarily begin to receive errors unless the system's margin is used up over time. If the system has extra margin, then PMD greater than 1 dB will take away from other forms of possible life time system degradation such as non-linearity, chromatic dispersion, bad splices, poor transmitters and receivers, laser and equipment fluctuations, etc.

Figure 9:
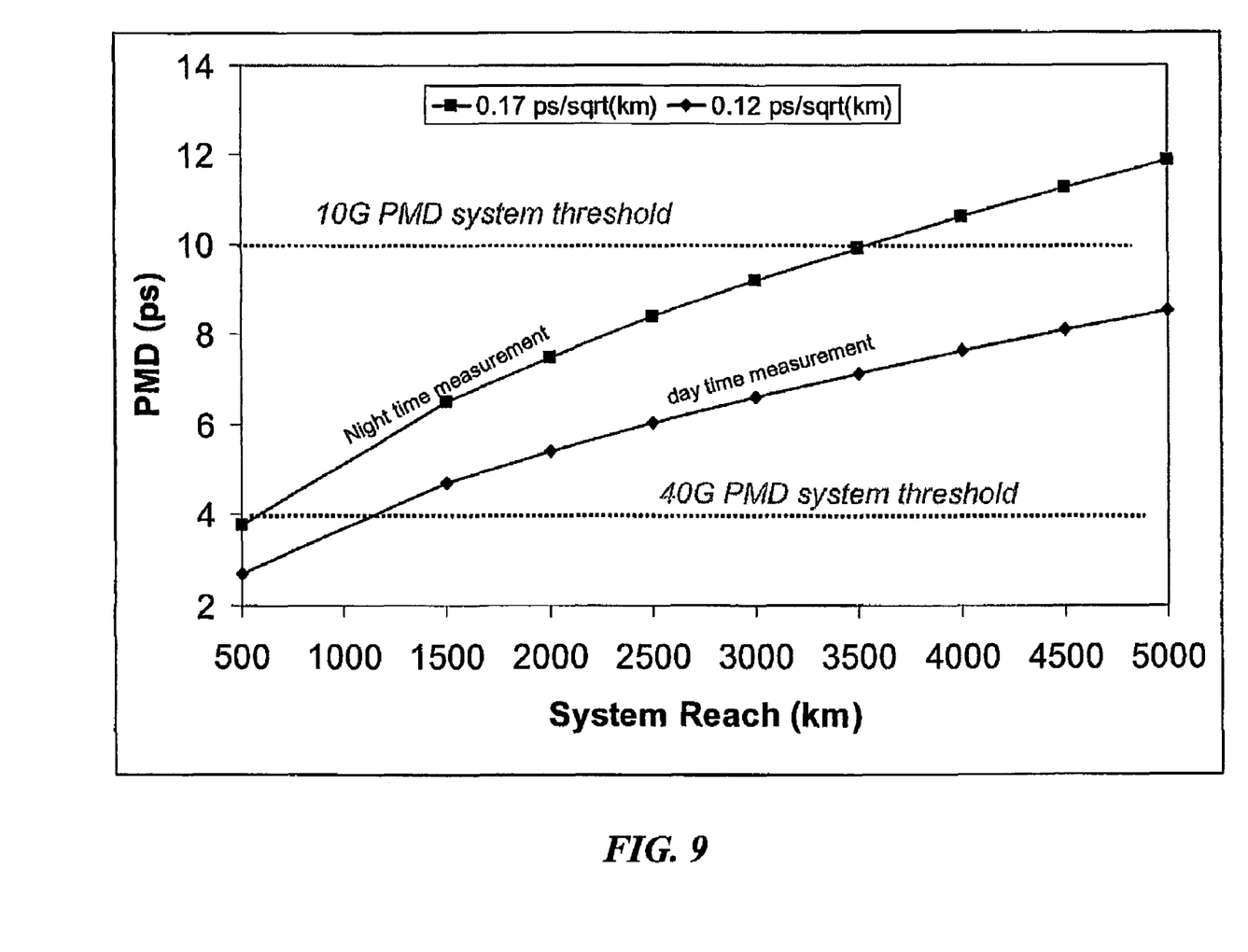
FIG. 9 is a graph illustrating the difference in system design if a night time PMD value were used versus a day time PMD value in an embodiment of the invention.

FIG. 9 is a graph illustrating the difference in system design if a night time PMD value were used versus a day time PMD value in an embodiment of the invention. With this data, network engineers can determine system reach before expensive regeneration has to be installed. Assuming 10 Gb/s system installation with a receiver PMD tolerance of 10 ps and using the measured PMD value of 0.12 ps/$\sqrt{(km)}$, simulation shows that network engineers can design a system with reach greater than 5000 km. In reality, during the colder months, the PMD along this route increases with decreasing temperature. Between day and night, the PMD coefficient changes from 0.12 ps/$\sqrt{(km)}$ to 0.17 ps/$\sqrt{(km)}$. The impact on the design is that the network should have been design with reach only up to 3500 km. A network design with reach greater than 5000 km will experience many system outages. Similar analysis can be made using a 40 Gb/s signal with a PMD tolerance of 4 ps. At 40 Gb/s, PMD tolerance is four times worse. FIG. 9 shows a difference of 500 km for a PMD tolerance of 4 ps.

What is claimed is:

1. A method of optimizing Polarization Mode Dispersion (PMD) measurements on an installed fiber, the method comprising:
    measuring PMD on the installed fiber over a time period;
    measuring ambient temperatures of the installed fiber over the time period; and
    processing the PMD measurements and the ambient temperature measurements to determine an optimal temperature range for performing future PMD measurements on the installed fiber.

2. The method of claim 1 wherein the time period is at least twelve hours.

3. The method of claim 1 wherein processing the PMD measurements and the ambient temperature measurements to determine an optimal temperature range comprises:
    identifying the highest of the PMD measurements; and
    identifying the ambient temperature measurements corresponding with the highest of the PMD measurements to determine the optimal temperature range for performing the future PMD measurements.

4. The method of claim 1 wherein processing the PMD measurements and the ambient temperature measurements to determine an optimal temperature range comprises:
    plotting the PMD measurements and the ambient temperature measurements in time; and
    identifying a correlation between the PMD measurements and the ambient temperature measurements.

5. The method of claim 4 further comprising:
    determining that the optimal temperature range comprises the warmest temperatures if the correlation comprises a positive correlation.

6. The method of claim 5 further comprising:
    determining that the optimal temperature range comprises the coolest temperatures if the correlation comprises a negative correlation.

7. The method of claim 1 wherein the installed fiber is buried.

8. The method of claim 1 wherein the optimal temperature range indicates a time of day to perform the future PMD measurements.

9. The method of claim 1 wherein the optimal temperature range indicates a time of year to perform the future PMD measurements.

10. A method of optimizing Polarization Mode Dispersion (PMD) measurements on an installed fiber, the method comprising:

measuring PMD on the installed fiber over at least a twelve hour time period;

measuring ambient temperatures of the installed fiber over the time period;

identifying the highest of the PMD measurements; and identifying the ambient temperature measurements corresponding with the highest of the PMD measurements to determine an optimal temperature range for performing future PMD measurements.

11. The method of claim 10 wherein the optimal temperature range indicates a time of day to perform the future PMD measurements.

12. The method of claim 10 wherein the optimal temperature range indicates a time of year to perform the future PMD measurements.

13. A method of optimizing Polarization Mode Dispersion (PMD) measurements on an installed fiber, the method comprising:

measuring PMD on the installed fiber over at least a twelve hour time period;

measuring ambient temperatures of the installed fiber over the time period;

plotting the PMD measurements and the ambient temperature measurements in time; and identifying a correlation between the PMD measurements and the ambient temperature measurements to determine an optimal temperature range for performing future PMD measurements.

14. The method of claim 13 further comprising:

determining that the optimal temperature range comprises the warmest temperatures if the correlation comprises a positive correlation.

15. The method of claim 14 further comprising:

determining that the optimal temperature range comprises the coolest temperatures if the correlation comprises a negative correlation.

16. The method of claim 13 wherein the optimal temperature range indicates a time of day to perform the future PMD measurements.

17. The method of claim 13 wherein the optimal temperature range indicates a time of year to perform the future PMD measurements.

18. A measurement network for measuring Polarization Mode Dispersion (PMD) on an installed fiber, the measurement network comprising:

a light system connected to the installed fiber at a first access point;

a PMD measurement system connected to the installed fiber at a second access point;

a temperature measurement system; and a control system in communication with the light system, the PMD measurement system, and the temperature system, the control system instructs the light system to transmit light over the installed fiber, instructs the PMD measurement system to measure PMD on the installed fiber and to transmit the PMD measurements to the control system, instructs the temperature measurement system to measure ambient temperatures of the installed fiber and to transmit the PMD measurements to the control system, and process the PMD measurements and the ambient temperature measurements to determine an optimal temperature range for performing future PMD measurements on the installed fiber.

19. The measurement network of claim 18 wherein:

the control system indicates the optimal temperature range to network engineers.

20. The measurement network of claim 18 wherein:

the control system generates a plot of the PMD measurements and the ambient temperature measurements for evaluation by network engineers to determine the optimal temperature range.

21. The measurement network of claim 18 wherein:

the control system instructs the PMD measurement system to measure PMD on the installed fiber and instructs the temperature measurement system to measure ambient temperatures of the installed fiber over at least a twelve hour time period.

22. The measurement network of claim 18 wherein the control system communicates with the light system, the PMD measurement system, and the temperature measurement system via wireless signals.

23. The measurement network of claim 18 wherein the optimal temperature range indicates a time of day to perform the future PMD measurements.

24. The measurement network of claim 18 wherein the optimal temperature range indicates a time of year to perform the future PMD measurements.

* * * * *